United States Patent [19]

Ogawa et al.

[11] Patent Number: 5,540,312

[45] Date of Patent: Jul. 30, 1996

[54] CHARGING CORD STORING STRUCTURE FOR AN ELECTRIC VEHICLE

[75] Inventors: Masao Ogawa; Hiroyuki Sako; Hiroyuki Shimmura; Kenji Kawaguchi, all of Saitama, Japan

[73] Assignee: Honda Giken Kogyo Kabushiki Kaisha, Tokyo, Japan

[21] Appl. No.: 325,524

[22] Filed: Oct. 19, 1994

[30] Foreign Application Priority Data

Oct. 19, 1993 [JP] Japan ................................ 5-286110

[51] Int. Cl.⁶ .................. H02G 11/00; H01R 13/447
[52] U.S. Cl. .............................. 191/12 R; 439/149
[58] Field of Search .......................... 191/12 R, 12 C, 191/12.2 R, 12.2 A, 12.4; 439/148, 149

[56] References Cited

U.S. PATENT DOCUMENTS

| | | | |
|---|---|---|---|
| 1,648,582 | 11/1927 | Dodge, Jr. ............................. | 191/12 R |
| 2,262,587 | 11/1941 | Kaempf ................................ | 191/12.2 R |
| 2,607,863 | 8/1952 | MacFarland ......................... | 191/12 R |
| 3,227,802 | 1/1966 | Pressley, Jr. ......................... | 191/12 R X |
| 3,999,640 | 12/1976 | Persson ................................ | 191/12.4 |
| 4,060,297 | 11/1977 | Marshall et al. .................... | 439/149 |
| 4,258,970 | 3/1981 | Bourdon et al. .................... | 439/149 |
| 5,145,040 | 9/1992 | Fladung .............................. | 191/12 R X |
| 5,445,252 | 8/1995 | McKee et al. ...................... | 191/12 R |

FOREIGN PATENT DOCUMENTS

| | | | |
|---|---|---|---|
| 265765 | 7/1964 | Australia ............................. | 191/12.4 |
| 539269 | 4/1993 | European Pat. Off. . | |
| 537065 | 4/1993 | European Pat. Off. . | |
| 608841 | 8/1994 | European Pat. Off. . | |
| 4212207 | 10/1993 | Germany ............................. | 191/12 R |

OTHER PUBLICATIONS

English Abstract and figure from Japan Patent 5-112270, published May 7, 1993.

Primary Examiner—Karen B. Merritt
Assistant Examiner—Scott L. Lowe

[57] ABSTRACT

A charging cord box has a first opening facing a cord outlet lid and a second opening at a substantially right angle to the first opening. A charging cord is passed through the first opening and the second opening. In storing the charging cord in the box, the charging cord can be lowered spontaneously by its own weight. Further, in drawing the charging cord from the box, a base portion of the charging cord is merely bent and no undue external force is applied to the charging cord. Accordingly, damage to the charging cord can be suppressed.

21 Claims, 13 Drawing Sheets

CHARGING CORD STORING STRUCTURE FOR AN ELECTRIC VEHICLE

BACKGROUND OF THE INVENTION

1. Field of the Invention

The present invention relates to an improvement in a charging cord storing structure for an electric vehicle.

2. Description of Related Art

A battery supporting device for an electric vehicle is disclosed in Japanese Patent Laid-open No. 5-112270, in which a battery is charged by a charger after opening a lid and drawing a cord stored in the vehicle as shown in FIG. 2 of this Japanese document.

In washing the vehicle, high-pressure water is sprayed against an outer surface of a vehicular body, so that the water easily enters the inside of the vehicle from a gap around the lid. Accordingly, it is necessary to improve air tightness of the lid, thereby resulting in a complex structure around the lid and an increase in cost. Furthermore, it is also necessary to periodically check a degree of air tightness of the lid, causing an increase in burden on a person for maintaining the vehicle.

Further, a direction of drawing the cord is substantially identical with a direction of mounting a base portion of the cord. In other words, a direction in which the cord projects from the charger is the same direction from which the cord is drawn from the charger. Therefore, a tension is frequently applied to the base portion of the cord. Accordingly, it is necessary to improve the rigidity of the base portion of the cord, causing an increase in cost.

SUMMARY OF THE INVENTION

It is therefore an object of the present invention to provide a charging cord storing structure which can improve the water sealability and the resistance to the tension applied to the cord.

According to the present invention, there is provided a charging cord storing structure for an electric vehicle, comprising a cord outlet lid openably mounted to a vehicular body cover, a plug stop located under the cord outlet lid for stopping a flange portion of a charging plug, and a charging cord box located under the plug stop for storing a charging cord.

Preferably, the charging plug is provided with a plug cap.

The plug cap is also preferably supported through a support ring and a belt to the charging plug or the charging cord.

Preferably, the charging cord box for storing the charging cord is formed with a first opening and a second opening directed at substantially right angles to the first opening.

The charging plug is stopped at its flange portion by the plug stop. The charging plug is then protected by the plug cap.

The plug cap is supported through the belt and the support ring to the charging plug or the charging cord, thereby preventing loss of the plug cap.

The charging cord is passed through the first opening and the second opening of the charging cord box.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

A preferred embodiment of the present invention will now be described with reference to the accompanying drawings.

Figure 1:
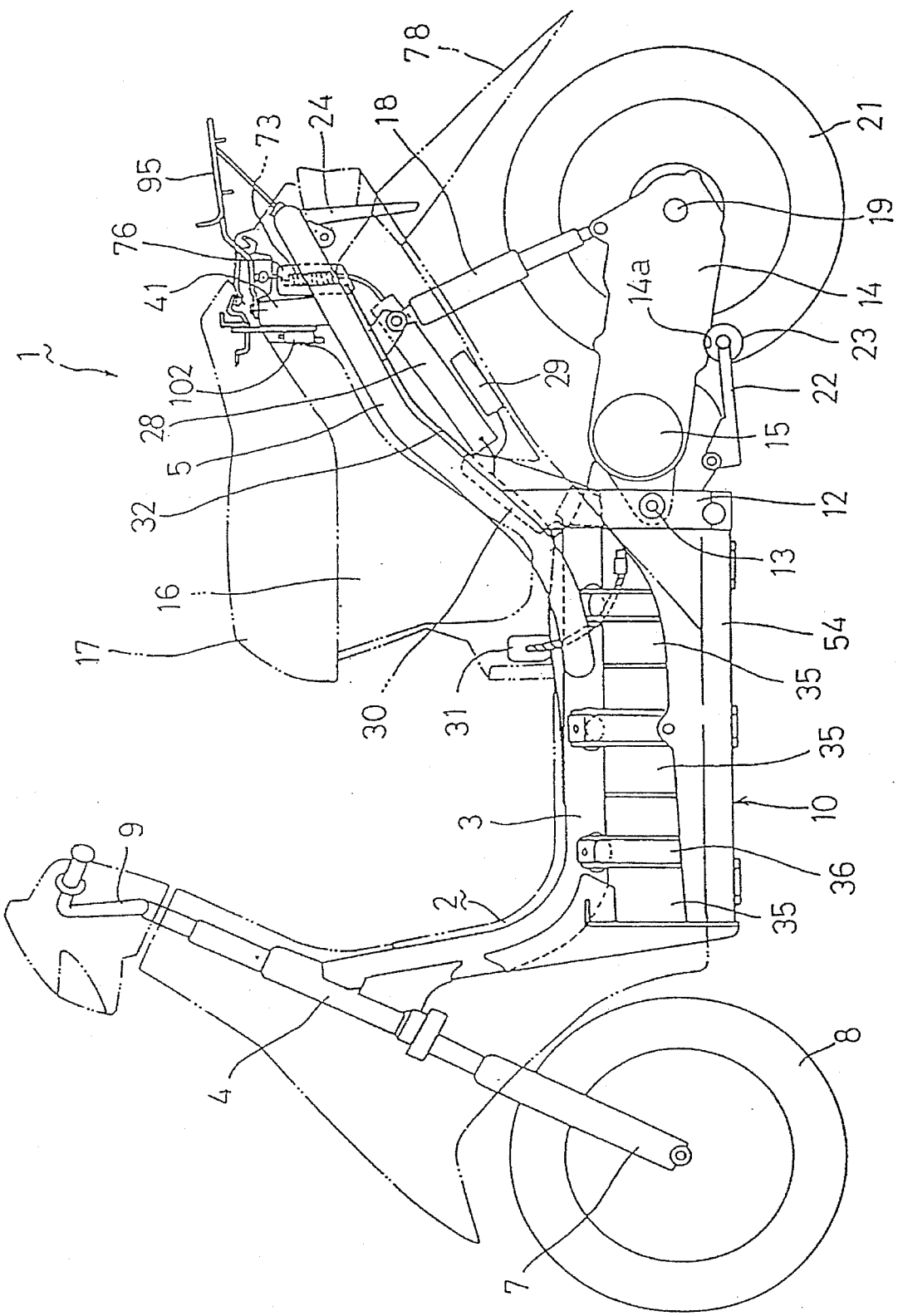
FIG. 1 is a side view of an electric vehicle according to the present invention.

FIG. 1 is a side view of an electric vehicle according to the present invention. The electric vehicle generally denoted by reference numeral 1 is a so-called electric motorcycle. A vehicular frame 2 of the electric vehicle 1 comprises a main frame 3, a head pipe 4 provided before the main frame 3, and a rear frame 5 provided behind the main frame 3. A front wheel 8 is mounted through a front fork 7 to the head pipe 4. A steering handle 9 is provided at an upper portion of the head pipe 4. A battery storing case 10 is suspended from the main frame 3. A power swing unit 14 (including a traveling motor 15) is pivotally connected at a front end thereof through right and left brackets 12 and a pivot shaft 13 to a rear portion of the main frame 3. A helmet storing portion 16 and a seat 17 are mounted on the upper side of the rear frame 5 inclined upwardly toward the rear end of the vehicle and a rear suspension 18 is mounted on the lower side of the rear frame 5. A rear portion of the power swing unit 14 is supported by a lower end of the rear suspension 18. A rear wheel 21 is mounted through an axle 19 to the rear portion of the power swing unit 14.

Electric parts such as a charger are arranged along the rear frame 5, and the vehicular frame 2 is generally covered with a cowl and a fender. This construction will be hereinafter described in detail with reference to the different drawings. Further, while a combined seat lock mechanism and plug lid lock mechanism is provided behind the seat 17, this construction will also be hereinafter described in detail.

In FIG. 1, a side stand 22, a roller 23, a recess 14a for receiving the roller 23 and a license plate mounting plate 24 are also shown.

Figure 2:
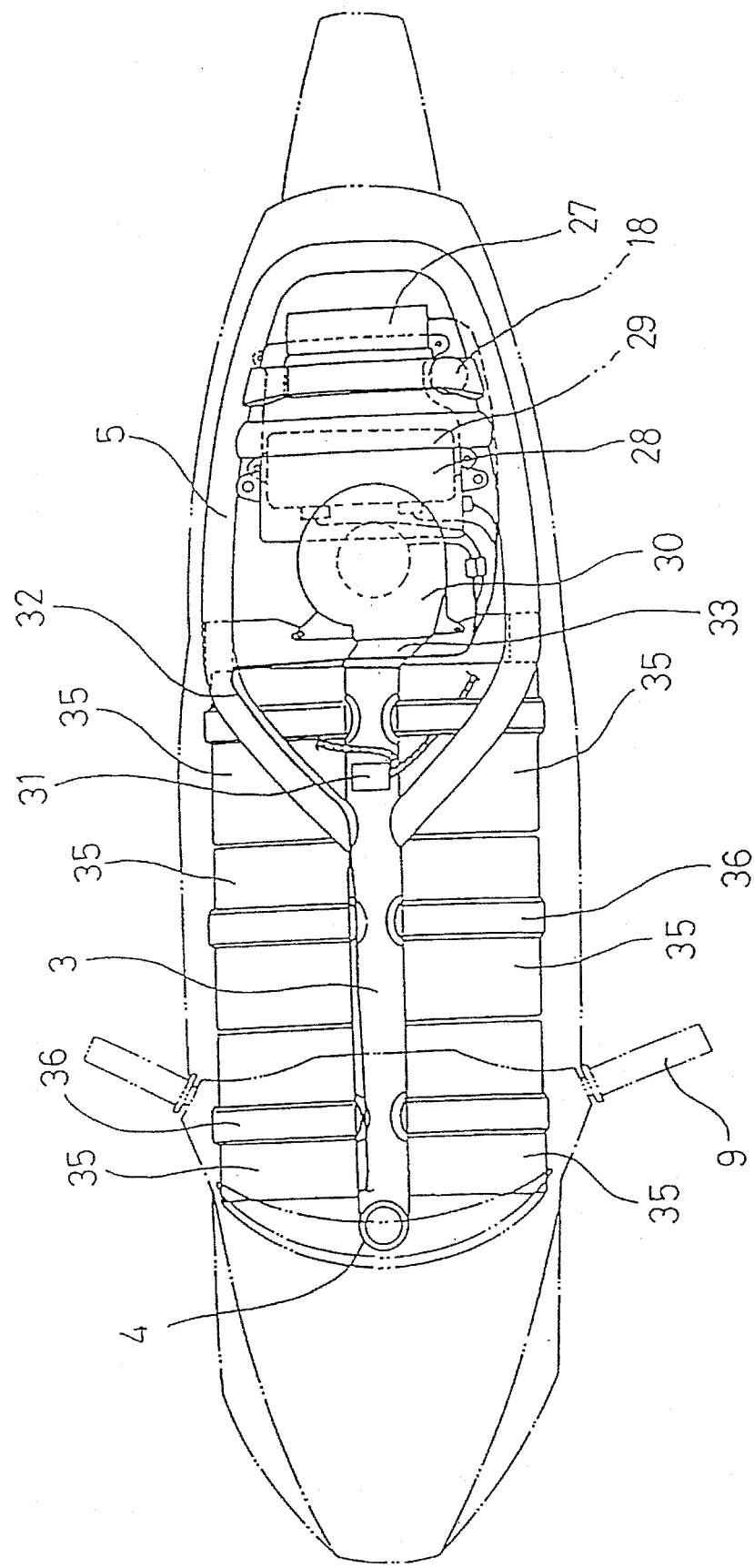
FIG. 2 is a plan view of the vehicle with a vehicular frame primarily illustrated according to the present invention.

FIG. 2 is a plan view of the vehicle according to the present invention in which the vehicular frame is primarily shown. As shown in FIG. 2, the rear frame 5 is substantially O-shaped in plan. Inside the rear frame 5 there are arranged a down regulator 27, controllers 28 and 29 (the controller 28 is a charge controller for performing control in charging batteries and the controller 29 is a travel controller for performing control of a motor or the like in relation to traveling of the vehicle), a battery cooling fan 30, and a fuse box 31 in this order from the rear toward the front of the vehicle. A harness 32 is also provided for connecting electric components.

The main frame 3 is a hollow pipe, which also serves as an air duct connected at one end thereof to a discharge duct 33 of the battery cooling fan 30. The structure of the main frame 3 also serving as the air duct will be hereinafter described.

In this preferred embodiment, six batteries 35 are mounted to the main frame 3 and are arranged in a right row and a left row. Each row has three batteries which extend in a longitudinal direction of the vehicle. A battery fixing band 36 is provided for each battery.

Figure 3:
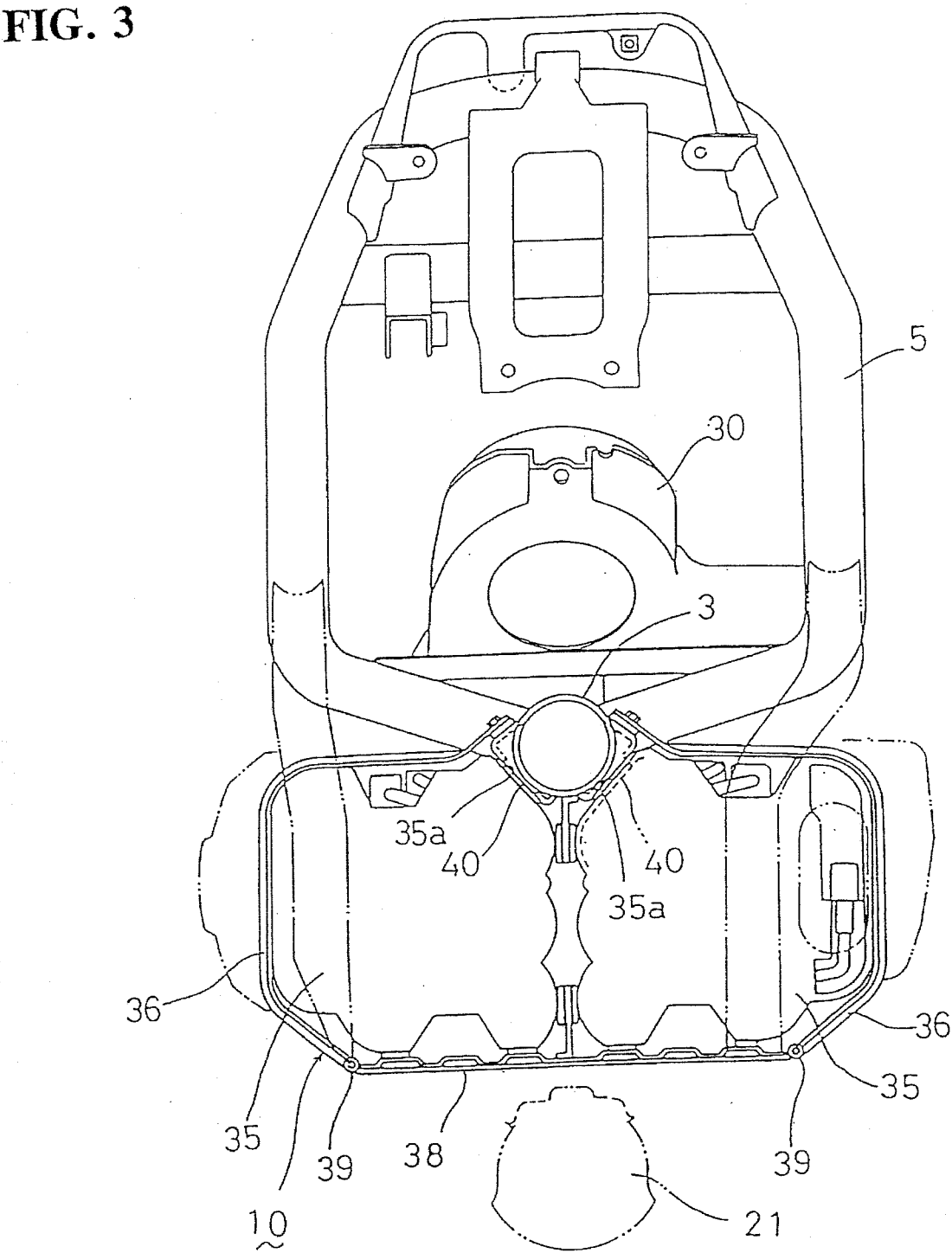
FIG. 3 is a transverse sectional view of the vehicle at a substantially central portion thereof according to the present invention.

FIG. 3 is a transverse sectional view of the vehicle at a substantially central portion thereof according to the present invention. As shown in FIG. 3 viewed from the front of the vehicle, it is featured that a bottom plate 38 of the battery storing case 10 is located under the main frame 3, that the batteries 35 are placed on the bottom plate 38, and that an air induction hole 35a of each battery 35 is in contact with the main frame 3 through a branch passage 40. The bottom plate 38 is a so-called corrugated plate, which is so formed as to have a large rigidity in a vertical direction. The battery fixing bands 36 are engaged at their lower ends with hinges 39 formed at right and left ends of the bottom plate 38.

Figure 4:
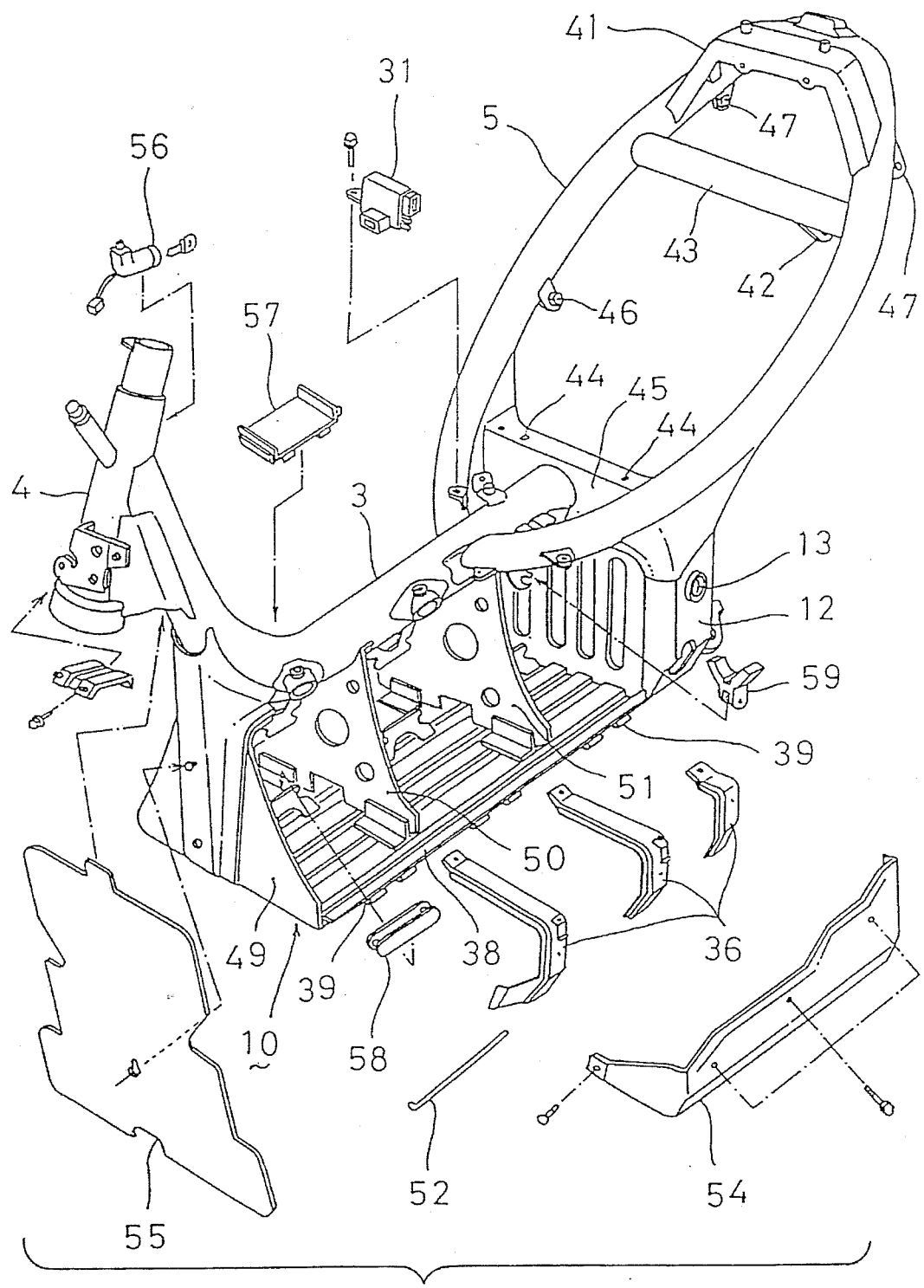
FIG. 4 is an exploded perspective view of the vehicular frame, a battery storing case, and accessories according to the present invention.

FIG. 4 is an exploded perspective view of the vehicular frame, the battery storing case, and accessories. Although not described with reference to FIGS. 2 and 3, a bridge bracket 41, a cross pipe 43 having a mounting tab 42 for the rear suspension 18, and a cross panel 45 having cooling fan mounting holes 44 extend between right and left curved portions of the O-shaped rear frame 5 in the transverse direction of the vehicle. The cross panel 45 is a member also extending between the right and left brackets 12 for supporting the pivot shaft 13. Controller mounting tabs 46 and 47 are provided on the rear frame 5.

Substantially triangular support brackets 49, 50, and 51 are suspended from the main frame 3 to support the bottom plate 38. The lower ends of the battery fixing bands 36 are fitted with the hinges 39 on each side of the bottom plate 38 and are pivotally supported by an elongated pin 52.

A battery case side lower cover 54 for covering a lower portion of each side of the battery storing case 10, a battery case front cover 55 for covering a front end of the battery storing case 10, a main switch 56 with an ignition key switch, cushion members 58 and 59 and a battery receiving plate 5 for preventing transverse slipping of each battery 35 are provided.

Figure 5:
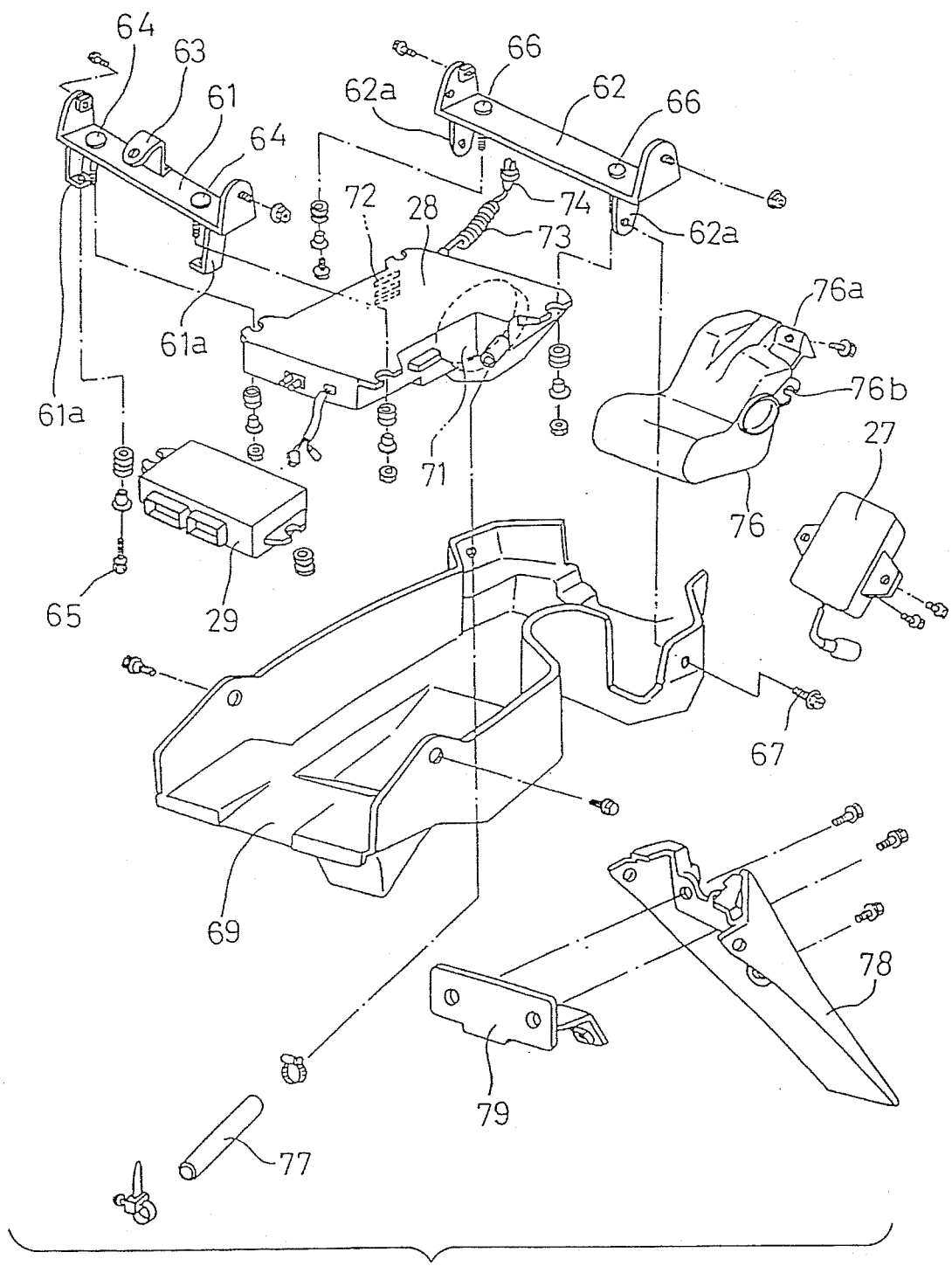
FIG. 5 is an exploded perspective view of controllers, a rear fender, and parts provided near it according to the present invention.

FIG. 5 is an exploded perspective view of the controllers, a rear fender, and parts provided near it. A controller front support 61 is bolted to the controller mounting tabs 46 shown in FIG. 4, and a controller rear support 62 is bolted to the controller mounting tabs 47 shown in FIG. 4.

The controller front support 61 is provided with an upper mounting tab 63 for mounting the battery cooling fan 30, bolts 64 for supporting a front portion of the charge controller 28, and leg portions 61a and bolts 65 for supporting the travel controller 29.

The controller rear support 62 is provided with bolts 66 for supporting a rear portion of the charge controller 28 and leg portions 62a and bolts 67 for supporting a rear portion of a rear fender 69. The rear fender 69 is located over the rear wheel 21 (not shown in FIG. 5) to originally serve as a mudguard and also to serve as a storing box for the controllers 28 and 29 etc. as shown.

The charge controller 28 must be forcibly cooled because internal elements generate heat during charging. Accordingly, the charge controller 28 is provided with a charger cooling fan 71 and an air induction hole 72.

A charging cord 73 is stored in a charging cord box 76. The charging cord has a charging plug 74. The charging cord box 76 is formed by a resin blow molding, and it is fixed at mounting tabs 76a and 76b to the vehicular frame 2.

An air discharge hose 77 permits heat inside the charger to escape. A tail fender 78 and a stay 79 for mounting the tail fender 78 are provided.

Figure 6:
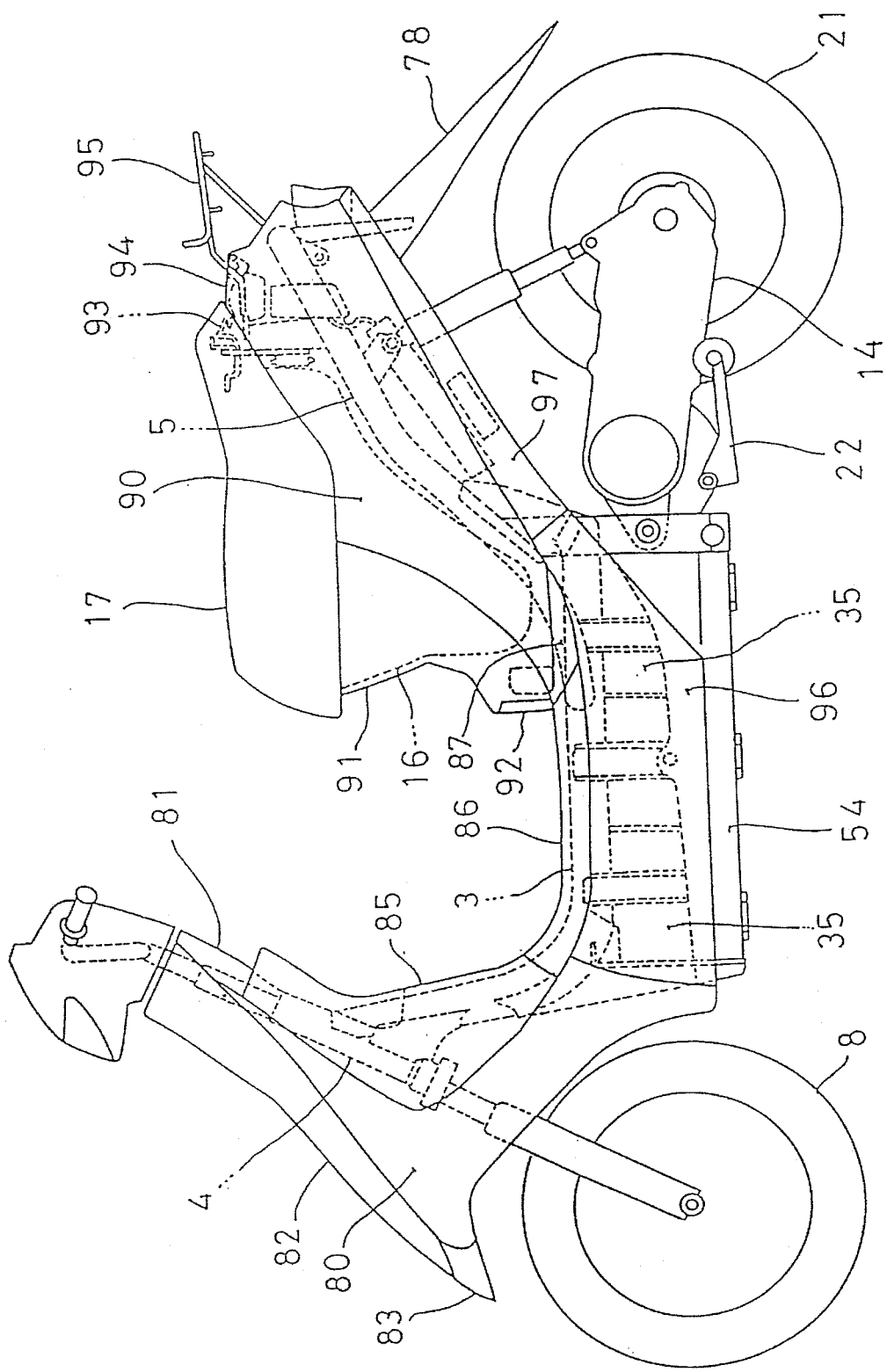
FIG. 6 is a side view of assembled fenders and covers of the electric vehicle according to the present invention.
Figure 7:
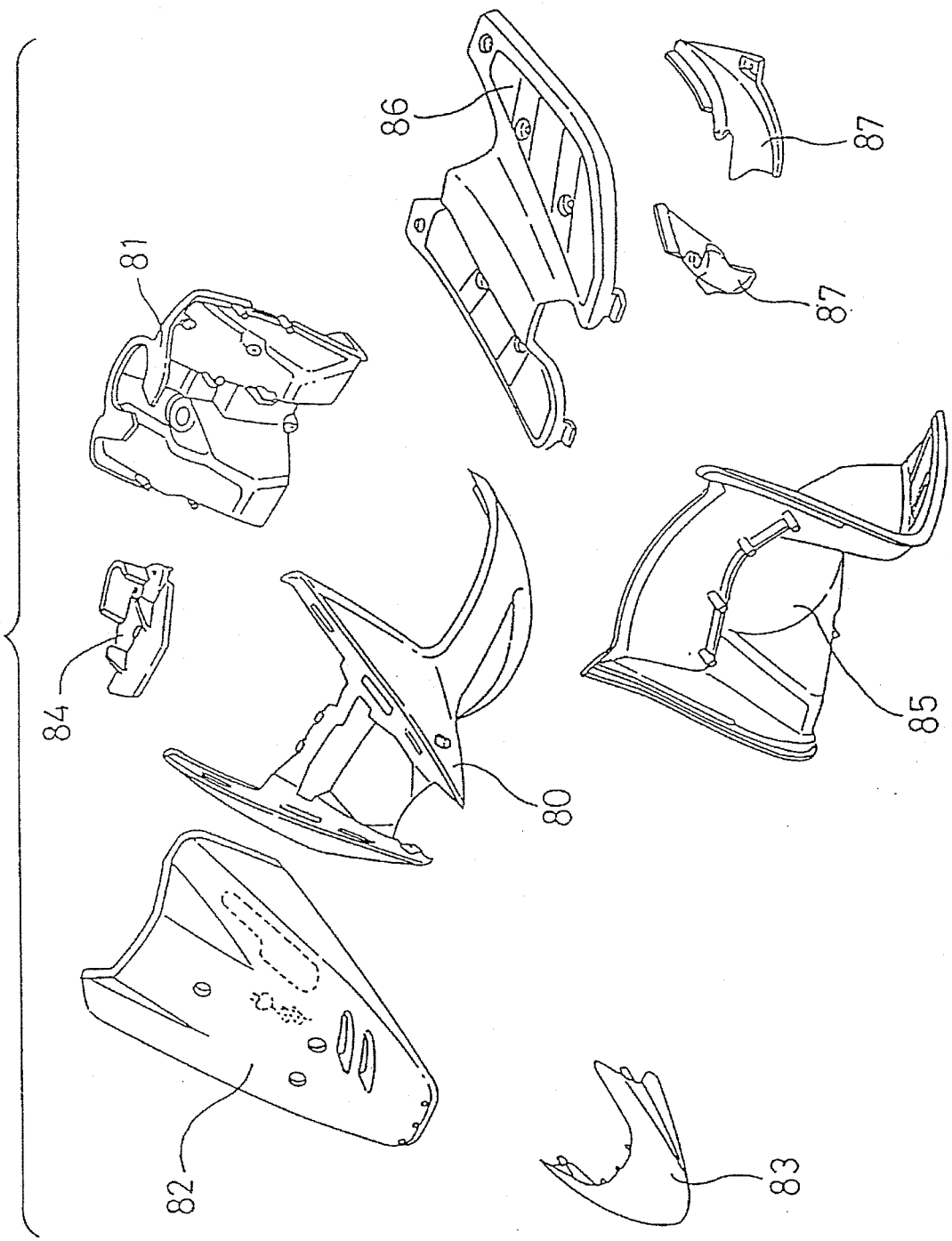
FIG. 7 is an exploded perspective view of the fenders and the covers at a front portion of the vehicle according to the present invention.

FIG. 6 is a side view of assembled fenders and covers of the electric vehicle according to the present invention; FIG. 7 is an exploded perspective view of the fenders and the covers at the front portion of the vehicle; and FIG. 8 is an exploded perspective view of the fenders and the covers at the rear portion of the vehicle.

Referring to FIG. 7, a front fender 80 and a front inner upper cover 81 are provided. A front cover 82 is mounted on a front upper portion of the front fender 80. A fender mudguard 83 is mounted on a front lower portion of the front fender 80. A steering mudguard 84, a front inner lower cover 85, a step floor 86 and right and left side floors 87 are provided. These parts are so mounted as to cover the main frame 3 and the head pipe 4 as shown in FIG. 6.

Figure 8:
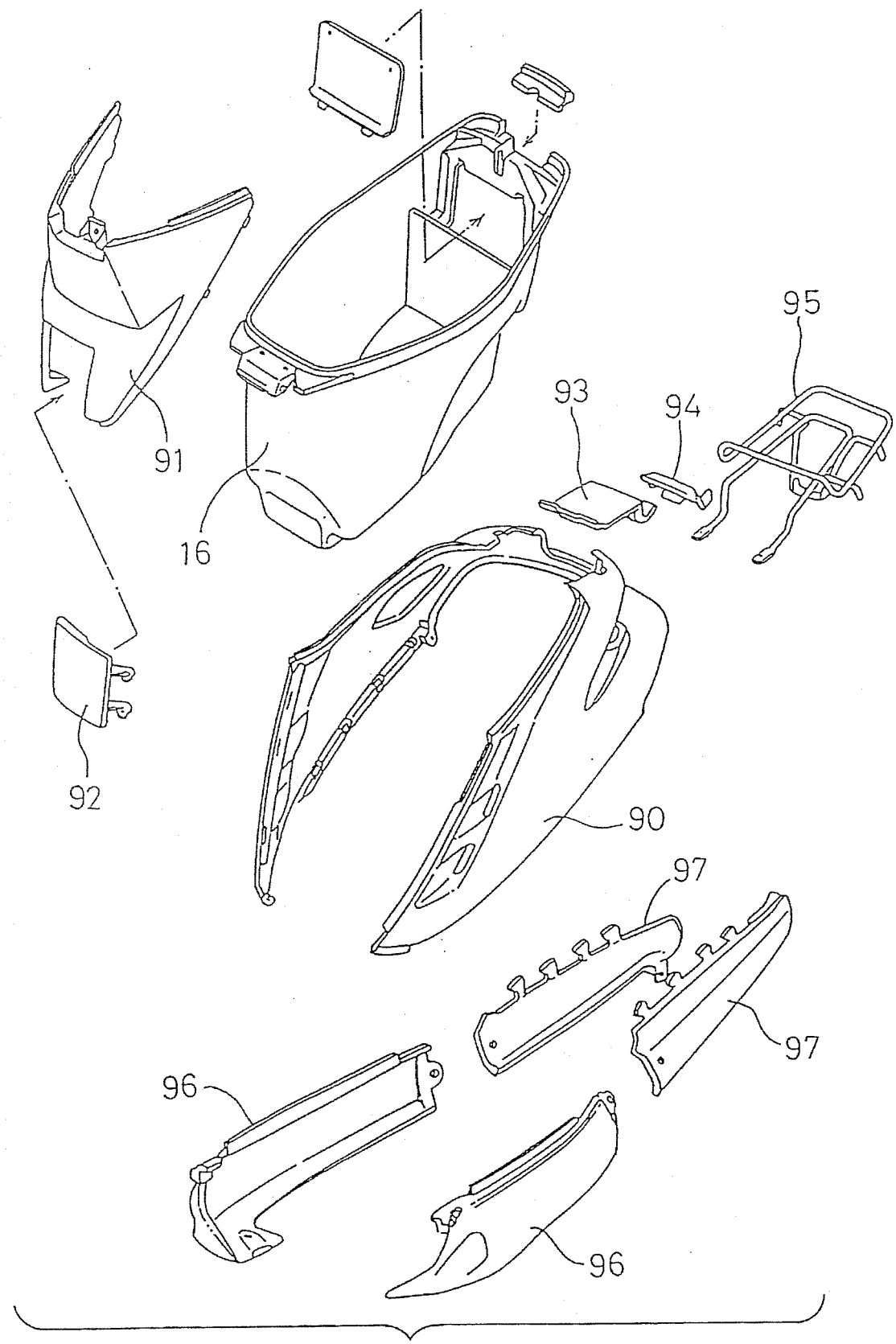
FIG. 8 is an exploded perspective view of the fenders and the covers at a rear portion of the vehicle according to the present invention.

Referring to FIG. 8, a body main cover 90 and a center cover 91 are mounted so as to cover the helmet storing portion 16. A fuse box lid 92 is operated for replacement of a fuse at any time. A first lid 93 closes a cord outlet opening and a second lid 94 closes the cord outlet opening. A rack 95 is provided. Right and left floor side covers 96 are suspended from the step floor 86 to cover right and left side portions of the battery storing case 10. Right and left side covers 97 extend along right and left lower edges of a rear portion of the body main frame 90. These parts are so mounted as to cover the main frame 3 and the rear frame 5 as shown in FIG. 6.

Parts shown by broken lines in FIG. 6 are the same as those shown in FIG. 1. Accordingly, the explanation thereof will be omitted herein.

Figure 9:
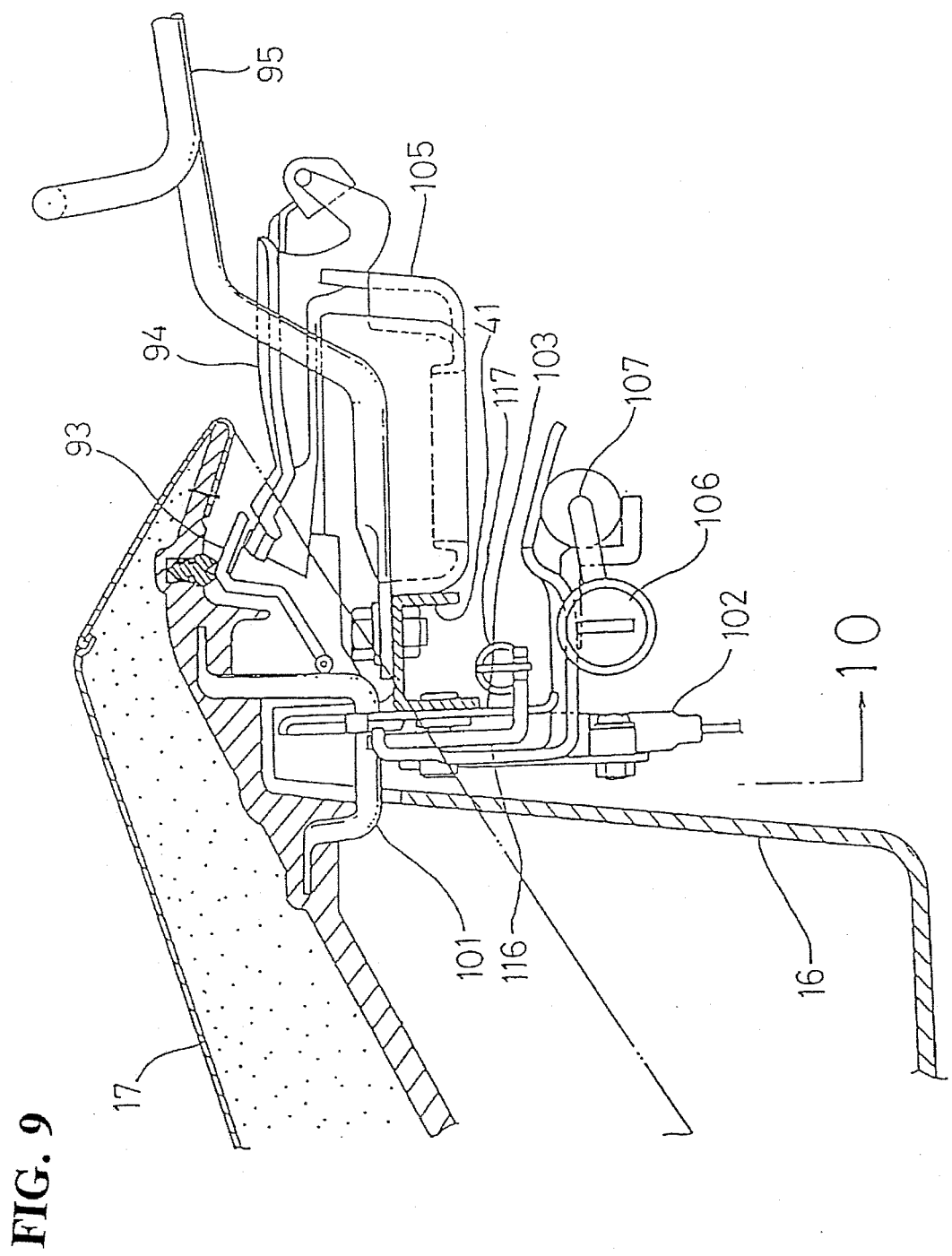
FIG. 9 is an enlarged view of a rear portion of a seat of the vehicle according to the present invention (a view showing a combined seat lock mechanism and plug lid lock mechanism)

FIG. 9 is an enlarged view of a rear portion of the seat of the vehicle according to the present invention (a view showing a combined seat lock mechanism and plug lid lock mechanism). A bent bar (or bent pipe) 101 is mounted to a rear lower portion of the seat 17 closing an upper opening of the helmet storing portion 16. A seat switch 102 is located under the bent bar 101. The seat switch 102 is bolted through a switch mounting plate 103 to the bridge bracket 41. The switch mounting plate 103 will be hereinafter described in detail.

The charging cord 73 shown in FIG. 1 can be drawn out by first opening the seat 17, secondly opening the first lid 93, and finally opening the second lid 94. A plug stop 105 is provided for retaining a plug provided at one end of the charging cord 73.

A lever 107 is linked to a key cylinder 106. When the key cylinder 106 is turned, the lever 107 is raised to permit the seat 17 to be opened. This mechanism will be next described in detail.

Figure 10:
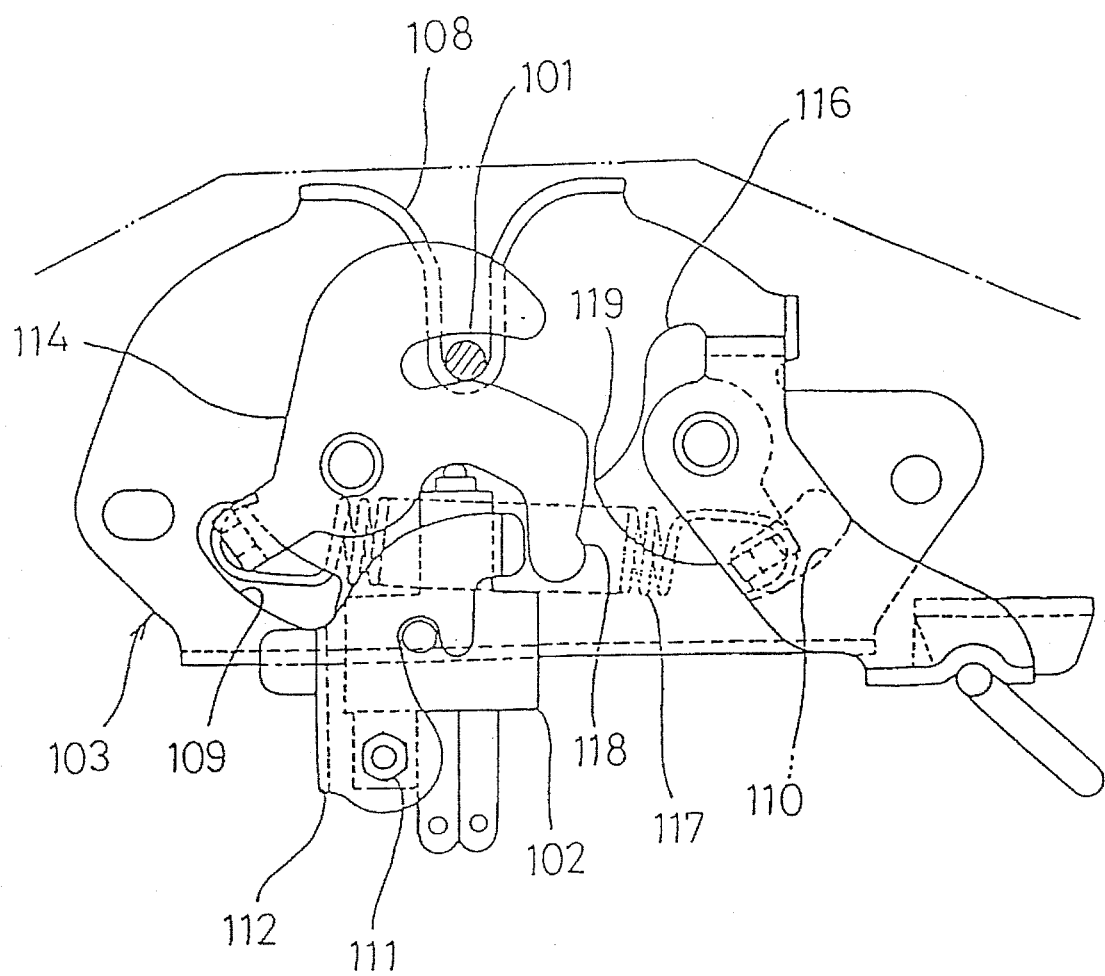
FIG. 10 is a view taken in a direction shown by an arrow 10 in FIG. 9.

FIG. 10 is a view taken in a direction shown by an arrow 10 in FIG. 9. The switch mounting plate 103 is a plate member having a guide groove 108 for guiding the bent bar 101 at an upper portion and also having two arcuate holes 109 and 110 at right and left lower portions.

The seat switch 102 is secured to a small bracket 112 by a bolt 111. The small bracket 112 is welded to a front surface of the switch mounting plate 103. Thus, the seat switch 102 is mounted to the switch mounting plate 103 at a central lower portion thereof.

A first swing plate 114 for depressing the seat switch 102 by a lowering motion of the bent bar 101 is pivotably mounted to the switch mounting plate 103. Further, a second swing plate 116 is pivotably mounted to the switch mounting plate 103.

The first switch plate 114 is normally biased in a counterclockwise direction by a spring 117, and the second swing plate 116 is normally biased in a clockwise direction by the spring 117.

When a passenger leaves the seat 17, the first swing plate 114 is slightly rotated in the counterclockwise direction from the position shown in FIG. 10 by the operation of the spring 117, so that an arm 118 of the first swing plate 114 comes into abutment against a cam 119 of the second swing plate 116 to stop in this position.

Since the second swing plate 116 is in rest, further rotation of the first swing plate 114 in the counterclockwise direction is inhibited, so that further rising of the bent bar 101 is restricted by the first swing plate 114. Accordingly, the seat 17 is locked to keep closed.

In other words, when a passenger sits on the seat 17, the first swing plate 114 is rotated in the clockwise direction by the bent bar 101 to depress the seat switch 102 and close it as shown in FIG. 10. Conversely, when the passenger leaves the seat 17, the first swing plate 114 is slightly rotated in the counterclockwise direction from the condition shown in FIG. 10 by the operation of the spring 117 to thereby open the seat switch 102. Thus, the presence or the absence of the passenger on the seat 17 can be electrically detected with the seat 17 kept locked. The seat 17 is opened in the following procedure.

First, the key cylinder 106 shown in FIG. 9 is turned to raise the lever 107. As a result, the second swing plate 116 shown in FIG. 10 is rotated in the counterclockwise direction, and the cam 119 of the second swing plate 116 becomes lower than the arm 118 of the first swing plate 114. As a result, the locking operation of the cam 119 is lost, and the first swing plate 114 is largely rotated in the counterclockwise direction by the operation of the spring 117 to permit free rise of the bent bar 101. Thereafter, the seat 17 is opened by hand.

Figure 11:
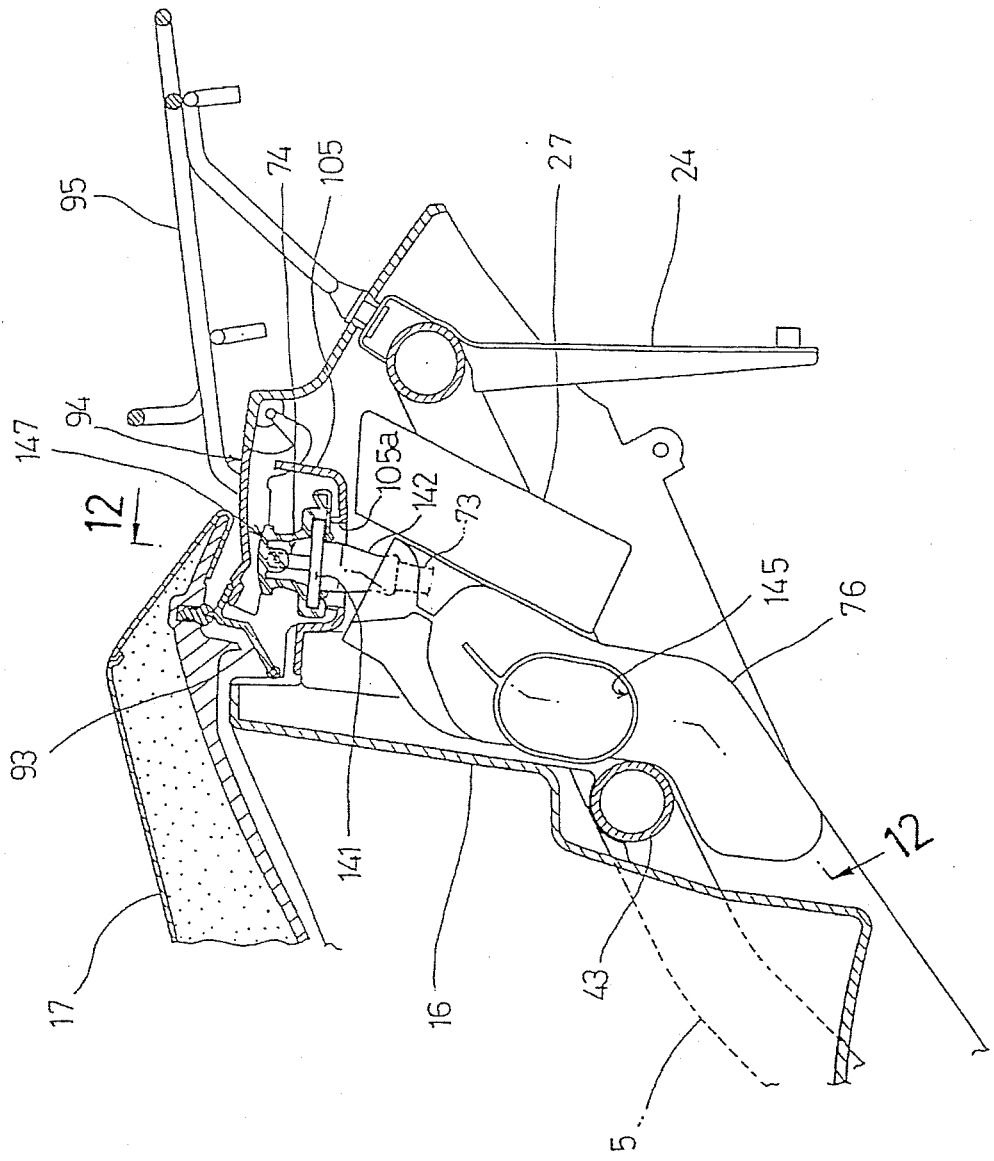
FIG. 11 is an enlarged view showing a charging cord storing structure according to the present invention.

FIG. 11 is an enlarged view showing a charging cord storing structure according to the present invention. The plug stop 105 located under the first lid 93 and the second lid 94 is formed with a through hole 105*a*. A flange portion 141 of the plug 74 is in rest on the periphery of the through hole 105*a*, and a plug neck 142 and the charging cord 73 depend from the flange portion 141 in this condition.

The charging cord box 76 in the form of a bag is located under the through hole 105*a* so as to be sandwiched between the cross pipe 43 and the down regulator 27.

Figure 12:
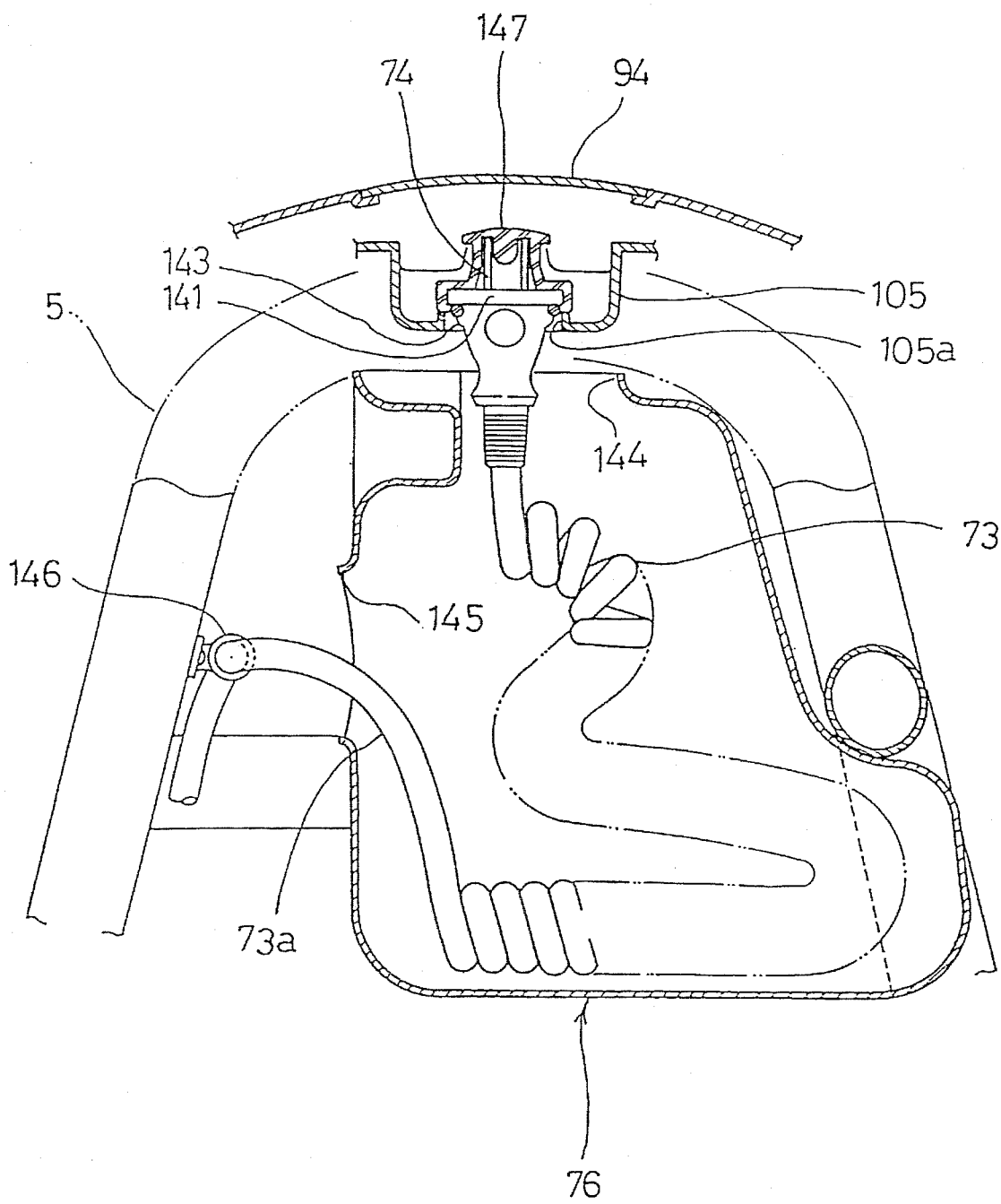
FIG. 12 is a cross section taken along the line 12 in FIG. 11.

FIG. 12 is a cross section taken along the line 12—12 in FIG. 11. It is featured that a first opening 144 and a second opening 145 of the charging cord box 76 are directed at about 90° to each other. The charging cord 73 meanderingly stored in the charging cord box 76 is partially derived from the box 76 through the second opening 145 to lead to the charge controller (see FIG. 1). A cord clamp 146 holds the derived part of the charging cord 73 to the rear frame 5.

Figure 13:
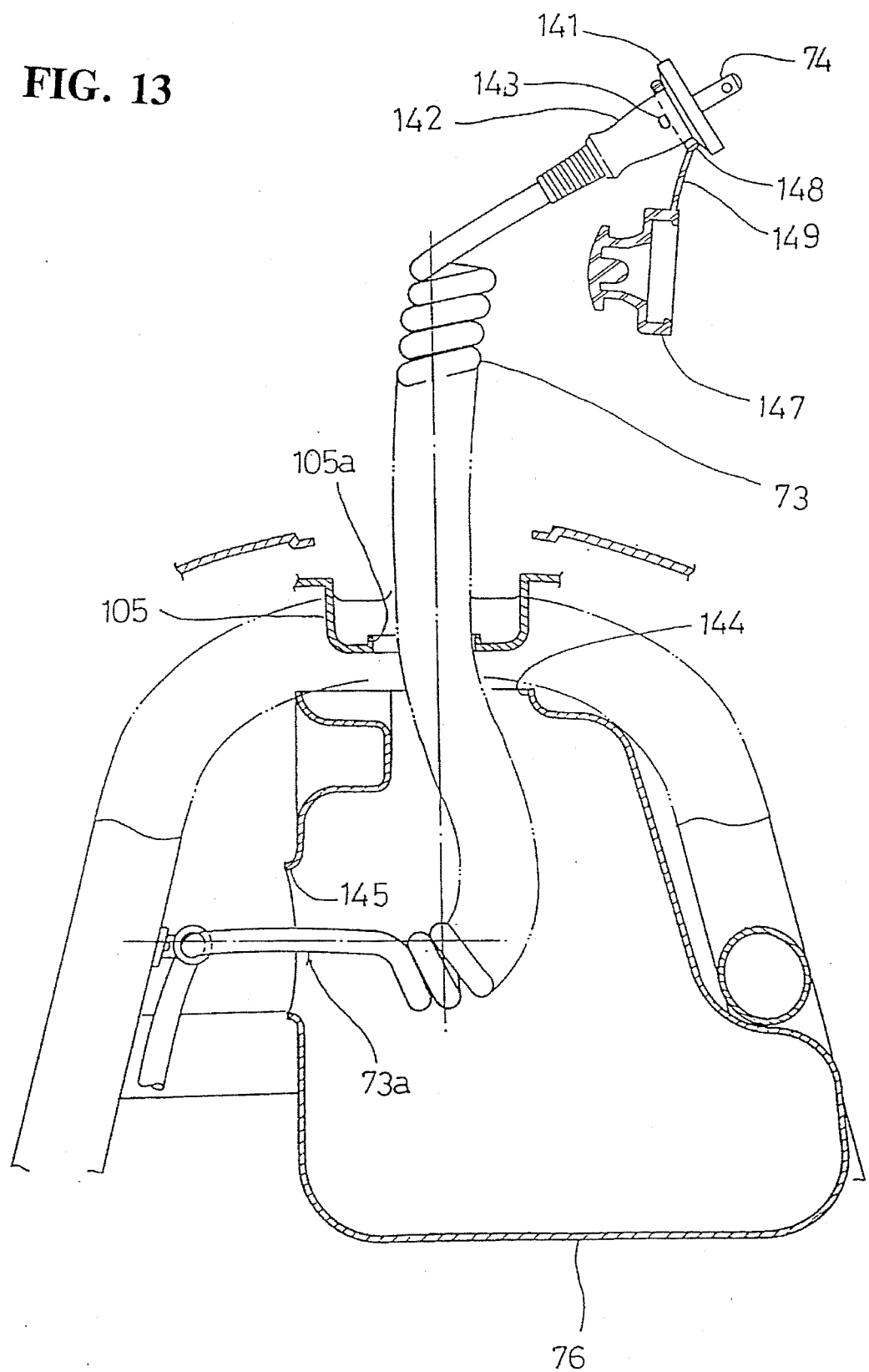
FIG. 13 is a view similar to FIG. 12, illustrating the operation of the present invention.

FIG. 13 is a view similar to FIG. 12, illustrating the operation of the present invention. Although not described with reference to FIGS. 11 and 12, the charging plug 74 according to the present invention is provided with a support ring 148 and a plug cap 147 with a belt 149. The support ring 148, the plug cap 147, and the belt 149 are integrally formed of a flexible material such as a resin. The support ring 148 is engaged with the plug neck 142, and the plug cap 147 is so designed as to removably cover the charging plug 74. Owing to the function of the belt 149 connecting the plug cap 147 to the support ring 148, there is no possibility of the plug cap 147 being lost. The support ring 148 is positioned between the flange portion 141 and projections 143 projecting from the plug neck 142, thereby preventing easy disengagement of the support ring 148 from the plug neck 142.

When the charging plug 74 is drawn out of the box 76, so as to charge the batteries, a tension is applied to a base portion 73*a* of the charging cord 73. However, since the second opening 145 is directed horizontally and the base portion 73*a* of the cord 73 is also directed horizontally, the base portion 73*a* of the cord 73 is merely bent upward upon application of the upward tension, and is not pulled in a longitudinal direction of the cord 73.

In storing the charging cord 73 after the charge of the batteries, the charging plug 74 is covered with the plug cap 147, and the charging cord 73 is vertically lowered into the charging cord box 76. The charging cord 73 is a curl cord designed to be freely deformed, and the second opening 145 is directed horizontally, so that the charging cord 73 vertically lowered is spontaneously stored into the box 76 by its own weight (see FIG. 12).

Finally, the flange portion 141 of the plug 74 comes into rest on the periphery of the through hole 105*a* of the plug stop 105. In this condition, the second lid 94 is first closed, the first lid 93 is then closed, and the seat 17 is finally closed as shown in FIG. 11.

In the stored condition of the charging cord 73 in the box 76, the charging plug 74 is protected and sealed by the plug cap 147. Therefore, even if external water enters the inside of the vehicular body, there is no possibility of the plug 74 being wet with the water.

The support ring 148 may be engaged with the charging cord 73. Further, although the lid for closing the cord outlet opening is composed of the first lid 93 and the second lid 94 in the above preferred embodiment, the lid may be formed as a single member.

As described above, according to the present invention, in a charging cord storing structure having a cord outlet lid openably mounted to a vehicular body cover and a plug stop located under the cord outlet lid for supporting a charging plug formed at one end of a charging cord, the charging plug is provided with a flange portion for stopping the charging plug. Accordingly, the charging plug can be easily stopped by the plug stop, so that a charging operation can be easily carried out.

Furthermore, since the charging plug is covered with the plug cap, wetting of the charging plug with water can be prevented. Accordingly, perfect air tightness of the vehicular body cover and the cord outlet lid mounted thereto is not required, so that the structure of the cord outlet lid etc. can be simplified.

The plug cap is attached through the support ring and the belt to the charging plug or the charging cord. Accordingly, loss of the plug cap can be prevented.

The charging cord box for storing the charging cord has the first opening and the second opening directed at substantially right angles to the first opening. Accordingly, when storing the charging cord in the box, the charging cord can be lowered spontaneously by its own weight. Further, in drawing the charging cord from the box, the base portion of the charging cord is merely bent and no undue external force is applied to the charging cord. Accordingly, damage to the charging cord can be suppressed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A charging cord storing structure for a charging cord for an electric vehicle, the charging cord having a charging plug with a flange portion and the charging cord storing structure comprising:

a cord outlet lid movably mounted on a vehicular body cover;

a plug stop located adjacent said cord outlet lid for stopping the flange portion of the charging plug during insertion of the charging cord into the charging cord storing structure; and a charging cord located adjacent said plug stop for storing the charging cord, the cord outlet lid being openable and closeable to open and close the charging cord bag.

2. The charging cord storing structure for an electric vehicle according to claim 1, wherein the lid covers the plug stop when the lid is closed.

3. The charging cord storing structure for an electric vehicle according to claim 1, wherein a plug neck is provided between the charging cord and the flange portion of the charging plug and wherein the plug stop is provided with a through hole, the flange portion of the charging plug rests on a periphery of the through hole when the charging plug is stopped by the plug stop, the plug neck and the charging cord extending into the charging cord bag during storage thereof.

4. The charging cord storing structure for an electric vehicle according to claim 1, wherein the electric vehicle has a cross pipe and a down regulator and wherein the charging cord bag is sandwiched between the cross pipe and the down regulator of the electric vehicle.

5. The charging cord storing structure for an electric vehicle according to claim 1, wherein the cord outlet lid comprises a first lid and a second lid, both of the lids being movable to expose and cover the plug stop and to provide access to the charging cord bag.

6. The charging cord storing structure for an electric vehicle according to claim 1, wherein the plug stop is provided with a first hole, a first opening and a second opening being provided in the charging cord bag, the charging cord extending through the first and second openings, the first opening being adjacent to a side of the charging cord bag which is non-parallel to a side of the charging cord bag having the second opening.

7. The charging cord storing structure for an electric vehicle according to claim 6, wherein the side of the charging cord bag having the first opening is generally perpendicular to the side of the charging cord bag having the second opening.

8. The charging cord storing structure for an electric vehicle according to claim 1, further comprising a plug cap for covering the charging plug.

9. The charging cord storing structure for an electric vehicle according to claim 8, wherein said plug cap is provided with a support ring engaged with one of said charging plug and said charging cord and a belt for connecting said support ring with said plug cap.

10. The charging cord storing structure for an electric vehicle according to claim 9, wherein said belt is flexible such that said plug cap can be moved to cover and uncover the charging plug, the plug cap sealing the charging plug when the plug cap covers the charging plug such that water cannot reach the charging plug.

11. A charging cord storing structure for an electric vehicle, comprising a cord outlet lid movably mounted to a vehicular body cover and a charging cord bag located adjacent said cord outlet lid for storing a charging cord, said charging cord bag having a first opening facing said cord outlet lid and a second opening at substantially a right angle to said first opening, and said charging cord extending through said first opening and said second opening.

12. The charging cord storing structure for an electric vehicle according to claim 11, wherein the cord outlet lid opens and closes the first opening in the charging cord bag.

13. The charging cord storing structure for an electric vehicle according to claim 11, wherein the electric vehicle has a cross pipe and a down regulator and wherein the charging cord bag is sandwiched between the cross pipe and the down regulator of the electric vehicle.

14. The charging cord storing structure for an electric vehicle according to claim 11, wherein the cord outlet lid comprises a first lid and a second lid, both of the lids being movable to expose and cover at least the first opening and to provide access to the charging cord bag.

15. The charging cord storing structure for an electric vehicle according to claim 11, wherein the charging cord has a charging plug with a flange portion and wherein the charging cord storing structure further comprises a plug stop located adjacent said cord outlet lid for holding the flange portion of the charging plug after insertion of the charging cord into the charging cord bag.

16. The charging cord storing structure for an electric vehicle according to claim 15, further comprising a plug cap for covering the charging plug, a support ring and a belt, the support ring being affixed to one of the charging plug and the charging cord and the belt extending between the support ring and the plug cap, the plug cap sealing the charging plug when the plug cap covers the charging plug such that water cannot reach the charging plug.

17. The charging cord storing structure for an electric vehicle according to claim 15, wherein a plug neck is provided between the charging cord and the flange portion of the charging plug and wherein the plug stop is provided with a through hole, the flange portion of the charging plug rests on a periphery of the through hole when the charging plug is held by the plug stop, the plug neck and the charging cord extending into the charging cord bag during storage thereof, the through hole in the plug stop being aligned with the first opening in the charging cord bag.

18. The charging cord storing structure for an electric vehicle according to claim 15, wherein the plug stop has a through hole therein, the plug stop being aligned with the first opening in the charging cord bag and the charging cord extending through the through hole in the plug stop.

19. A charging cord storing structure for a charging cord for an electric vehicle, the charging cord having a charging plug with a flange portion and the charging cord storing structure comprising:

a cord outlet lid movably mounted on a vehicular body cover, said cord outlet lid being openable when a seat of the electric vehicle is opened;

a plug stop located adjacent said cord outlet lid for stopping the flange portion of the charging plug during insertion of the charging cord into the charging cord storing structure; and a charging cord bag located adjacent said plug stop for storing the charging cord, the cord outlet lid being openable and closeable to open and close the charging cord bag.

20. The charging cord storing structure for an electric vehicle according to claim 19, wherein said seat may be closed while said cord outlet lid remains open.

21. The charging cord storing structure for an electric vehicle according to claim 19, and further including a storage container located below said seat.

* * * * *